United States Patent [19]

Haunschild

[11] Patent Number: 4,624,748

[45] Date of Patent: Nov. 25, 1986

[54] CATALYST SYSTEM FOR USE IN A DISTILLATION COLUMN REACTOR

[75] Inventor: Willard M. Haunschild, Tillamook, Oreg.

[73] Assignee: Chevron Research Company, San Francisco, Calif.

[21] Appl. No.: 625,995

[22] Filed: Jun. 29, 1984

[51] Int. Cl.[4] .............................................. B01D 3/00
[52] U.S. Cl. ............................... 203/29; 203/DIG. 6; 422/192; 422/193; 422/216; 422/218; 55/479
[58] Field of Search ............... 422/191, 192, 211, 193, 422/216, 218; 203/DIG. 6, 29; 55/479

[56] References Cited

U.S. PATENT DOCUMENTS

| | | | |
|---|---|---|---|
| 1,995,293 | 3/1935 | Clark | 422/211 |
| 3,366,457 | 1/1968 | Hunter | 422/191 |
| 3,634,535 | 1/1972 | Haunschild | 203/28 |
| 3,751,232 | 8/1973 | Borre et al. | 422/191 |
| 4,232,177 | 11/1980 | Smith, Jr. | 203/DIG. 6 |

FOREIGN PATENT DOCUMENTS 0008860  3/1980  European Pat. Off. ...... 203/DIG. 6

Primary Examiner—Bernard Nozick
Attorney, Agent, or Firm—S. R. LaPaglia; Q. T. Dickinson; V. J. Cavalieri

[57] ABSTRACT

A novel catalyst system for use in a distillation column reactor is disclosed including annularly-defined spaces within the reactor comprised of vapor-permeable material with packed catalyst and alternately positioned vapor barrier means.

4 Claims, 1 Drawing Figure

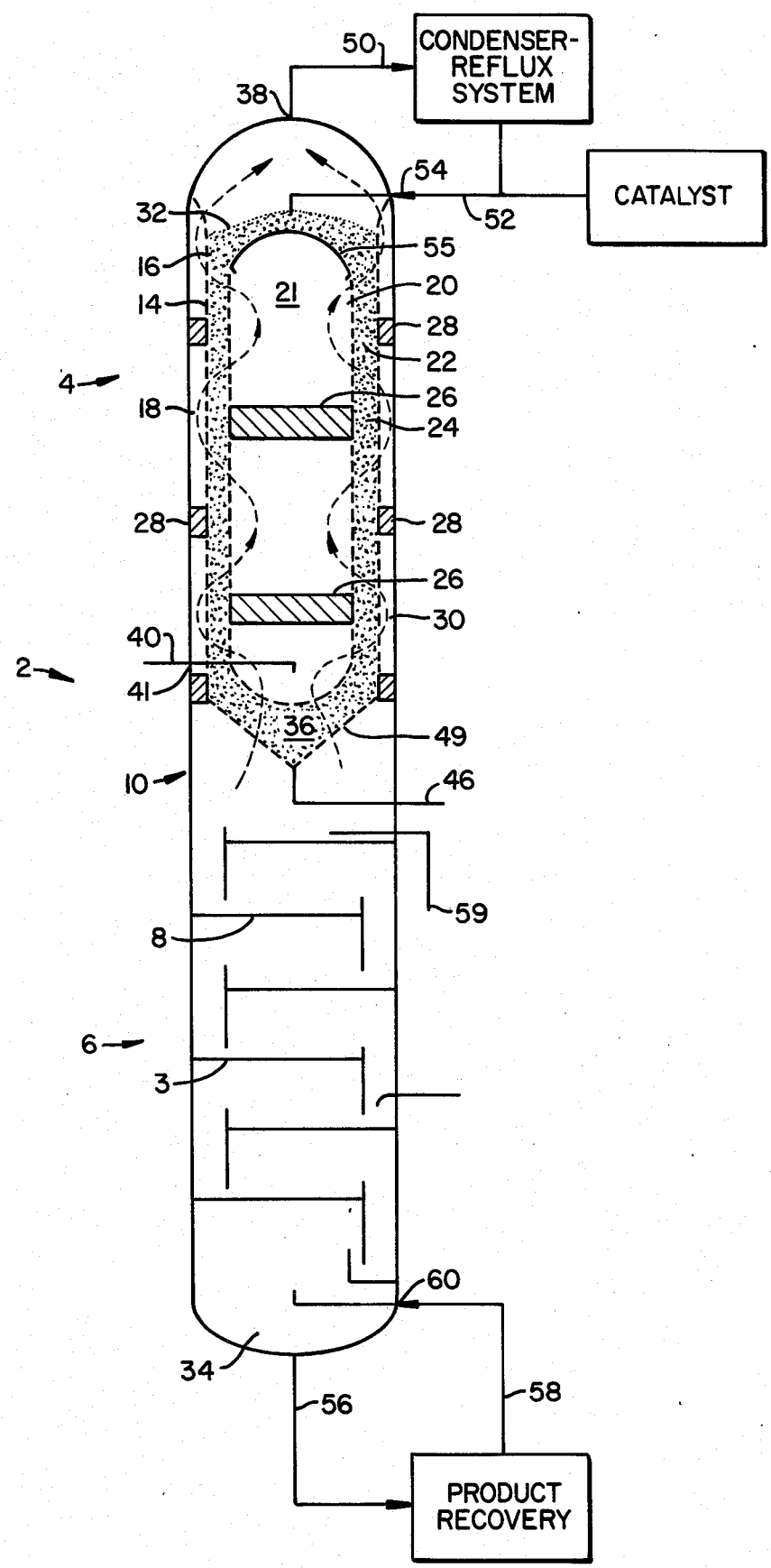

CATALYST SYSTEM FOR USE IN A DISTILLATION COLUMN REACTOR

BACKGROUND OF THE INVENTION

The present invention relates to a catalyst system for use in a distillation column reactor. A distillation column reactor is an apparatus for simultaneously carrying out a distillation and a chemical reaction to drive an equilibrium-limited reaction to completion by removing at least one of the products by virtue of its difference in boiling point. Such reactors and uses therefor are described in U.S. Pat. Nos. 3,629,478; 3,634,534; 3,634,535; 4,232,177; 4,242,530; and 4,302,356, incorporated by reference herein.

The present invention relates specifically to a distillation column reactor which employs a catalyst and more specifically to a catalyst system for use therein. The catalyst system of the invention solves the problem of retaining the catalyst in a distillation column without interfering with the distillation process. The prior art has taught placing the catalyst in the liquid downcomers, in small external reactors, on sieve distillation trays or by using the catalyst particles as a distillation packing. The last method presents a problem because of the very fine size of typical etherification catalyst, such as Amberlyst 15. It has also been suggested to place the catalyst in a cloth fabric support which is suspended in the distillation column.

SUMMARY OF THE INVENTION

The present invention relates to a catalyst system for use in a distillation column reactor. The system comprises a first wall formed at least in part of a vapor-permeable material and which is positionable within a wall of the distillation column reactor to define a first space; a second wall, also formed at least in part of a vapor-permeable material, located within the first wall, the second wall defining a central space and the first and second walls defining a second space; means to retain a packed bed of catalyst in the second space; a plurality of vapor barrier means positionable alternately in the central space and the first space in a spaced apart relationship perpendicularly along an axis common to the walls; liquid inlet means and liquid outlet means positioned at opposite ends of the catalyst system; and vapor inlet means and vapor outlet means positioned at opposite ends of the catalyst system.

BRIEF DESCRIPTION OF THE DRAWING

The FIGURE is a vertical side cross-sectional view of a distillation column reactor employing the catalyst system of the present invention.

DETAILED DESCRIPTION OF THE PREFERRED EMBODIMENTS

The present invention relates to a catalyst system for use in a distillation column reactor. Although this system may be used advantageously for any liquid-vapor equilibrium-limited reaction employing a catalyst, it is described herein with reference to its use in a process for etherating a teritary olefin-containing stream and, in particular, for the production of methyl t-butyl ether (MTBE) from an isobutylene-containing stream by reaction with methanol.

In one aspect, in the system of the present invention the catalyst is retained in the annulus formed by two concentric cylinders, generally formed at least in part of a fine mesh screen wire or some other porous material. Vapor barriers placed alternately in the center of the inner cylinder and in the annular space between the outer cylinder and the distillation column reactor shell force the vapors to pass through the catalyst bed at each stage. Because liquid flow is downward through the annular bed of catalyst, there is provided a multi-stage countercurrent flow of liquid and vapor through the packed bed of catalyst.

A distillation column reactor employing the present catalyst system has many important advantages over conventional fixed bed reactors and previously described distillation reactor concepts. First, it allows essentially complete conversion of the tertiary olefin to the desired ether by continuously removing the ether product from the reaction zone. This is less an advantage for the production of MTBE where the reaction goes 95% to completion at equilibrium but is quite important for higher boiling olefins where equilibrium are less favorable, e.g., about 75% for $C_5$ olefins. Second, it allows nearly complete reaction of the methanol thus eliminating or greatly reducing the need for facilities to recover and recycle methanol. This is done by distilling the methanol away from the ether bottoms product as discussed hereinbelow and by consuming essentially all the methanol in the distillation reactor, since the reactants may now be fed in essentially stoichiometric proportions. As noted above, the present catalyst system allows for the multistaged countercurrent contact of vapor and liquid on the surface of very fine catalyst spheres required for catalysis while at the same time minimizing pressure drop and avoiding liquid flooding. With regard to liquid flow, the catalyst bed is a conventional down flow packed-bed reactor. With regard to the vapor flow, however, the arrangement is a multi-pass radial flow reactor.

The catalyst system of the present invention also allows for periodic or continuous catalyst replacement without interrupting the operation of the process. This is an important advantage over all the methods heretofore proposed for incorporating the catalyst in a distillation column in a discrete package. Catalysts which cannot be conveniently replaced must be rigorously protected from catalyst poisons by guard chamber reactors upstream of the distillation reactor.

The provision to add fresh catalyst at the top of the distillation reactor and withdraw spent catalyst at the bottom allows complete utilization of the acid function of the catalyst to absorb catalyst poisons. This reduces the catalyst cost and permits less expensive feed purification facilities to be used.

Finally, the distillation reactor uses the exothermic heat of reaction to generate at least a portion of the vapor traffic to operate the distillation process. This saves energy input to the reboiler and automatically controls temperature and prevents localized hot spots. In fixed bed reactors, the temperature must be controlled by periodic liquid quench or by packing the catalyst in a thin tubes immersed in a heat transer medium.

The temperature in the distillation reactor is determined by the boiling point of, for example, the $C_4$ hydrocarbons at any given pressure, that is, at constant pressure a change in the temperature of the system indicates a change in the composition in the column. Thus, to change the temperature, the pressure is changed. By increasing the pressure, the temperature in the system is increased. Generally, pressures in the range of from 0 to 400 psig, preferably 30 to 150 psig are employed. For a $C_4$-containing stream, the reaction with methanol will be carried out generally at pressures in the range of from 10 to 300 psig, which will generally mean temperatures in the range of from 10° to 100° C.

The catalyst system of the present invention when applied to the etherification of $C_4$ and $C_5$ tertiary olefins is placed in the upper portion of the distillation column reactor. The lower portion of the column is known as the conventional distillation section. The function of this portion of the column is to separate the ether product from the methanol and unreacted feed components. This function is complicated by the facts that methanol forms azeotropes with both MTBE and TAME (tertiary amyl methyl ether) and that methanol is higher boiling than MTBE. These problems may be overcome by the introduction of compounds which form lower boiling azeotropes in the lower distillation portion of the column which carry the methanol into the distillation reactor section where it is consumed by the reaction. In this way, it appears to be possible to produce a bottoms product essentially free of methanol.

Suitable azeotroping agents include n-butane, isobutane, butene-1, butene-2, 3-methyl-1-butene, 2-methyl-2-butene, 2-pentene and n-pentane as exemplary of any paraffin or olefin in the $C_4$–$C_6$ boiling range of from about $-20°$ C. to 65° C. The overhead product stream from the process consisting of paraffins and linear olefins in the $C_4$–$C_5$ boiling range could be recycled for this purpose. Probably the best choice for an azeotroping agent is the feedstream itself, since its use imposes no additional load on the columns and overhead facilities.

Since any catalyst which migrates from the reactor portion to the distillation portion of the column would destroy ether product by catalyzing the reversed reaction, any fugitive catalyst must be deactivated, preferentially by the introduction of a catalyst poison which would be unable to reach the upper portion of the column because of its elevated boiling point. If fresh feed is used as the azeotroping agent as discussed above, the poisons in the feed would accomplish this purpose as well, hence deliberate addition of a poison will be required only in unusual circumstances, for example, where an ultra-clean feed is used or gross catalyst migration occurs.

Catalysts useful in the etherification reaction with the present catalyst system are the solid cation exchange resins which are well known. The most preferred catalyst for the etherification reaction is Amberlyst 15. Generally, catalysts suitable are the cation exchange resins which contain sulfonic acid groups and which have been obtained by polymerization or copolymerization of aromatic vinyl compounds followed by sulfonation. Examples of aromatic vinyl compounds suitable for preparing polymers or copolymers are: styrene, vinyl toluene, vinyl naphthalene, vinyl ethyl benzene, methyl styrene, vinyl chlorobenzene and vinyl xylene. The macroreticular form of these catalysts is preferred because of the much larger area exposed and the limited swelling which all of such resins undergo in a non-aqueous hydrocarbon medium.

The FIGURE illustrates an embodiment of a distillation column reactor in accordance with the present invention. It shows a distillation column reactor 2 having a reactor portion 4 and a distillation portion 6 with a plurality of trays 8. These portions are housed in a cylindrical reactor shell 10 which may be formed of any metal useful in such reactors, such as iron, steel, titanium, and the like. Located within and concentric with the reactor shell 10 in reactor portion 4 is the catalyst system which comprises a first cylindrical wall 14 which is formed at least in part of a vapor-permeable material. The perforations or holes 16 in the first cylindrical wall 14 are conduits for passage of the vapor stream and may be of sizes as desired, depending primarily on the particle size of the catalyst. If the holes are too large for retention of catalyst particles, they may be covered with screen or other protective devices to retain the catalyst particles therein. The first cylindrical wall 14 preferably comprises an exterior screen such as the so-called scallops employed in radial flow catalytic reforming reactors. In this preferred embodiment the first wall is not truly cylindrical.

The first cylindrical wall 14 is located within and concentric with the reactor shell 10 and is placed in a spaced apart relationship therewith to define a first annular space 18.

The catalyst system in one embodiment of the present invention also comprises a second cylindrical wall 20, which, like the first cylindrical wall 14, is formed at least in part of a vapor-permeable material. The second cylindrical wall 20 is located within and concentric with the first cylindrical wall 14 and as such, defines a second annular space 22 therewith. The second annular space 22 contains a packed bed of catalyst particles 24. The second cylindrical wall also defines a central space 21.

The catalyst is retained in the second annular space 22 by catalyst retaining means associated therewith. In the embodiment illustrated in the FIGURE, the catalyst retaining means comprise the first cylindrical wall 14 and the second cylindrical wall 20, but auxiliary retaining means such as scallops (not shown) may also be employed.

In accordance with the invention, the present catalyst system includes vapor barrier means 26, 28 which are positioned alternately in the central space 21 and the first annular space 18 in a spaced apart relationship perpendicularly along the axis common to the distillation column reactor shell 10, first cylindrical wall 14 and second cylindrical wall 20. The vapor barrier means preferably fill the entire space in which they are positioned so they can effectively block the passage of vapor therethrough. The alternate positioning of the vapor barrier means in the central space 21 and the first annular space 18 forces the vapor to travel generally horizontally through the packed bed of catalyst 24 in space 22 as shown by the schematic vapor traffic pattern represented by the dashed line 30.

The radial cross-sectional area available for vapor flow through the catalyst bed between the vapor spaces is much greater than the horizontal cross-sectional interstitial space of the catalyst bed available for vapor flow if the entire reactor area was filled with catalyst. The resulting low vapor velocity directed essentially perpendicular to the liquid flow allows the liquid to flow downwardly through the catalyst bed without "flooding". The vapor barriers are generally made of steel, as is the reactor in general, though other materials of construction may be employed.

The vapor barriers, as measured along the catalyst system axis, should be long enough to ensure that most of the vapor gets around the barrier by flowing across the catalyst bed to get into the other vapor conduit rather than merely being diverted upwardly through the catalyst bed. The ideal length depends on the distance radially through the catalyst bed and the vertical spacing of the barriers.

The distillation column reactor is provided in reactor portion 4 with vapor outlet means 38 through which vapor exits the reactor and passes along line 50 to a conventional condensor-reflux drum system. A condensed liquid reflux portion is returned by line 52 through reactor liquid inlet 54 into the catalyst system liquid inlet 32.

The uppermost vapor barrier 55 in the central space 21 also serves to distribute liquid reflux and catalyst to the second annular space 22.

The distillation column reactor is also provided in distillation portion 6 with liquid outlet means 34 through which liquid exits the reactor and passes along line 56 to a product recovery system which generally includes a reboiler (not shown) from which vapor is returned to the distillation portion 6 via line 58 through vapor inlet 60. The distillation column reactor also is associated with feed line 40 for feeding the reactants into the distillation column reactor through feed inlet 41.

A specific catalyst poison may also be introduced at poison inlet means 59 to deactivate fugitive catalyst and prevent it from destroying ether product by catalyzing the reverse reaction.

The end of the central space 26 near feed inlet 41 and catalyst support screen 48 is formed at least in part of vapor permeable material so as to provide a vapor inlet 36, a means for vapor rising from the distillation portion 6 to pass through the catalyst space 22 and enter the central space 21, and a liquid exit/vapor inlet 36 to facilitate liquid flowing down through the catalyst space 22.

The catalyst system may also include catalyst withdrawal means 46. Fresh catalyst may be added to the system by slurrying the catalyst with a condensed reflux portion and adding it via inlet 54 through the catalyst system liquid inlet 32 and into the second annular space 22.

In operation, liquid flows downwardly through the second annular space 22 to contact a packed bed of etherification catalyst 24 contained therein. In the meantime, vapor from the distillation portion 6 rises through vapor inlet means 36 into central space 21 whereupon it is forced by vapor barrier means 26 to flow through the packed bed of catalyst 24 eventually reaching the first annular space 18 and continuing to rise therein until contacting vapor barrier means 28. When the vapor contacts barrier means 28, it is again forced back through the packed bed of catalyst 24 into central space 21 and so on through the catalyst system. In this way, efficient multi-stage countercurrent contacting of liquid and vapor over the catalyst is achieved. Although the catalyst system of the present invention has been described with reference to a cylindrical embodiment, other geometrical ways in achieving the same results are considered equivalent, including various geometrical configurations wherein the first space is not annular in cross-section but is defined by a multiplicity of longitudinal vapor conduits of any appropriate and convenient symmetrical cross-section, including but not limited to circular, square, rectangular, triangular, hexagonal, scalloped; etc. and formed at least in part of vapor-permeable membrane.

Although the present invention has been illustrated by reference to specific embodiments, it will be apparent to those skilled in the art that various changes and modifications may be made which clearly fall within the scope of this invention. It is not the intent of Applicant to be bound by the specific embodiments described, but rather only by the appended claims.

What is claimed is:

1. A catalyst system for use in a distillation column reactor comprising:
    (a) a first wall, formed at least in part of a vapor-permeable material, positioned within a wall of the distillation column reactor to define a first space;
    (b) a second wall, formed at least in part of a vapor-permeable material, located within the first wall, the second wall defining a central space and the first and second walls defining a second space;
    (c) means to retain a packed bed of catalyst in the second space;
    (d) a plurality of vapor barrier means positionable alternately in the central space and the first space in a spaced apart relationship perpendicularly along an axis common to the walls;
    (e) liquid inlet means and liquid outlet means positioned at opposite ends of the catalyst packed bed retaining means; and
    (f) vapor inlet means and vapor outlet means positioned at opposite ends of the catalyst packed bed.

2. The catalyst system of claim 1 further comprising catalyst addition means and catalyst withdrawal means positioned at opposite ends of the catalyst packed bed.

3. A catalyst system for use in a distillation column reactor comprising:
    (a) a first cylindrical wall, formed at least in part of a vapor-permeable material, positioned within and concentric with a wall of the reactor to define a first annular space;
    (b) a second cylindrical wall, formed at least in part of a vapor-permeable material, located within and concentric with the first cylindrical wall, the second cylindrical wall defining a central space and the first and second cylindrical walls defining a second annular space;
    (c) means to retain a packed bed of catalyst in the second annular space;
    (d) a plurality of vapor barrier means positionable alternately in the central space and the first annular space in a spaced apart relationship perpendicularly along the axis common to the cylindrical walls;
    (e) liquid inlet means and liquid outlet means positioned at opposite ends of the catalyst packed bed retaining means; and
    (f) vapor inlet means and vapor outlet means positioned at opposite ends of the catalyst packed bed.

4. The catalyst system of claim 3 further comprising catalyst addition means and catalyst withdrawal means positioned at opposite ends of the catalyst packed bed.

* * * * *